US009156398B2

(12) United States Patent
Voos

(10) Patent No.: US 9,156,398 B2
(45) Date of Patent: Oct. 13, 2015

(54) METHOD FOR OPERATING A MOTOR VEHICLE AND MOTOR VEHICLE

(71) Applicant: GM GLOBAL TECHNOLOGY OPERATIONS LLC, Detroit, MI (US)

(72) Inventor: Alexander Voos, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 13/974,666

(22) Filed: Aug. 23, 2013

(65) Prior Publication Data
US 2014/0055253 A1 Feb. 27, 2014

(30) Foreign Application Priority Data
Aug. 24, 2012 (DE) .......................... 10 2012 016 776

(51) Int. Cl.
*G08B 21/00* (2006.01)
*B60Q 1/30* (2006.01)
*B60R 9/00* (2006.01)

(52) U.S. Cl.
CPC .... *B60Q 1/30* (2013.01); *B60R 9/00* (2013.01)

(58) Field of Classification Search
CPC ........ B25J 11/00; B25J 17/025; B25J 19/023; B25J 5/005; B25J 9/041; B25J 9/08; B25J 9/10; B61C 17/12; G05D 1/0229; B41J 11/06; B41J 13/08; B41J 13/103; B41J 13/106; B41J 13/14; B41J 3/28
USPC ......... 340/431, 432, 436, 438, 439, 446–448, 340/459, 461, 463, 471, 568.1–568.4
See application file for complete search history.

(56) References Cited

U.S. PATENT DOCUMENTS

| 4,988,974 | A | * | 1/1991 | Fury et al. ..................... 340/431 |
| 5,258,741 | A | * | 11/1993 | Fuller ....................... 340/426.31 |
| 2002/0027502 | A1 | * | 3/2002 | Mayor .......................... 340/431 |

(Continued)

FOREIGN PATENT DOCUMENTS

| DE | 102004022113 A1 | 11/2005 |
| DE | 202006014422 U1 | 11/2006 |

(Continued)

OTHER PUBLICATIONS

German Patent Office, German Patent Search Report for Application No. 102012016776.8, dated May 27, 2013.

*Primary Examiner* — Daniel Previl
(74) *Attorney, Agent, or Firm* — Ingrassia Fisher & Lorenz PC

(57) ABSTRACT

A method is provided for operating a motor vehicle. At least one transport device is rigidly connected to the motor vehicle in an outer region, an object is fastened to the transport device and the motor vehicle includes, but is not limited to a sensor. The one transport device in a state in which it is connected to the motor vehicle is partially arranged within a recording range of the sensor. The method includes, but is not limited to determining whether one object is fastened to the transport device takes place based on data determined by the at least one sensor. In the event that it is determined that the object is fastened to the transport device, determining of at least one parameter takes place. The parameter characterizes a possible disconnecting of the one object from the transport device, based on data determined by the sensor.

14 Claims, 5 Drawing Sheets

(56) References Cited

U.S. PATENT DOCUMENTS

| | | | |
|---|---|---|---|
| 2003/0020461 A1* | 1/2003 | Nomura et al. | 324/200 |
| 2007/0283840 A1* | 12/2007 | Huard et al. | 104/202 |
| 2010/0030734 A1* | 2/2010 | Chunilal | 707/3 |
| 2010/0031484 A1* | 2/2010 | Metzler et al. | 28/172.1 |
| 2011/0187064 A1* | 8/2011 | Breiner | 280/4 |

FOREIGN PATENT DOCUMENTS

| | | |
|---|---|---|
| DE | 102006028627 A1 | 10/2007 |
| DE | 102011002957 A1 | 7/2012 |
| EP | 0718155 A1 | 6/1996 |
| EP | 2385013 A1 | 11/2011 |
| GB | 2467720 A | 8/2010 |

* cited by examiner

METHOD FOR OPERATING A MOTOR VEHICLE AND MOTOR VEHICLE

CROSS-REFERENCE TO RELATED APPLICATION

This application claims priority to Patent Application No. 10 2012 016 776.8, filed Aug. 24, 2012, which is incorporated herein by reference in its entirety.

TECHNICAL FIELD

The technical field relates to a method for operating a motor vehicle, to a motor vehicle, a motor vehicle, a computer program product and a computer-readable medium.

BACKGROUND

From DE 10 2004 022 113 A1 a system and a method for monitoring motor vehicle trailers in driving mode with a camera device for the image recording of the relative alignment of rear area of the towing vehicle and front area of the trailer, an evaluation subsystem for the recorded data and interfaces for the driving-related further processing of the evaluated data are known. Here, one or a plurality of templates each defining a certain relative alignment is stored in the evaluation subsystem, which serve as reference data for associated alignment angles of the vehicle combination for the evaluation system. Furthermore, the evaluation subsystem is equipped for carrying out correlations between images of the respective currently recorded relative alignment and of the template(s) in order to detect information regarding alignment angles which point to a critical driving situation and transmit corresponding signals to the interfaces for further processing relevant to the driving mode.

At least one object is to state a method for operating a motor vehicle, a motor vehicle, a computer program product and a computer-readable medium which make possible an improvement of the operational safety during a transport of objects by means of the motor vehicle. In addition, other objects, desirable features and characteristics will become apparent from the subsequent summary and detailed description, and the appended claims, taken in conjunction with the accompanying drawings and this background.

SUMMARY

A method is provided for operating a motor vehicle. At least one transport device can be connected to the motor vehicle in an outer region of the motor vehicle. At least one object can be fastened to a transport device and the motor vehicle comprises at least one sensor. The at least one transport device in a state connected to the motor vehicle is at least partially arranged within a recording range the at least one sensor, and comprises determining, if at least one object is fastened to the at least one transport device takes place based on data determined by the at least one sensor. In the event that it is determined that at least one object is fastened to the at least one transport device, a determining of at least one parameter takes place. The at least one parameter characterizes a possible disconnection of the at least one object from the at least one transport device, based on data determined by the at least one sensor. Further, a determining if the at least one object is disconnecting from the at least one transport device takes place, based on the at least one determined parameter. In the event that it is determined that the at least one object is disconnecting from the at least one transport device, an outputting of a warning message by means of an output device of the motor vehicle takes place.

A rigid connection of the transport device to the motor vehicle means that the transport device in the state connected to the motor vehicle has a fixed substantially unchangeable position relative to the motor vehicle.

The method according to the mentioned embodiment makes possible an improvement of the operational safety during a transport of objects with the motor vehicle, i.e., during a transport of objects fastened to the at least one transport device. This takes place in particular through the determining of at least one parameter characterizing a possible disconnecting of the at least one object from the at least one transport device, based on data determined by the at least one sensor, and by determining if the at least one object is disconnecting from the at least one transport device, and the outputting of a warning message if such is indeed the case. This makes possible a monitoring of objects fastened to the transport device and a preferably early warning of the occupants of the motor vehicle, in particular of the driver of the motor vehicle from an imminent disconnecting of a fastening of the at least one transported object. Accidents which could be caused through lost objects can thereby be avoided in an advantageous manner.

The at least one sensor is preferably selected from an electromagnetic sensor, in particular a radar sensor or a lidar sensor, an acoustic sensor, in particular an ultrasound sensor, and an optical camera. The mentioned sensors, also called surround sensors, are increasingly provided in motor vehicles, as a result of which the number of components required for the method can be advantageously reduced.

In an embodiment of the method, a determining if there is a connection between the motor vehicle and at least one transport device additionally takes place. In this embodiment, the determining if at least one object is fastened to the at least one transport device takes place in the event that it is determined that there is a connection between the motor vehicle and at least one transport device. Thus, in this embodiment, the monitoring of the at least one object to be transported takes place by means of data determined by the at least one sensor, for example by the at least one optical camera only if there is an existing connection between the motor vehicle and the transport device. If there is no connection between the motor vehicle and a transport device, a taking of images by means of the at least one optical camera and an evaluation of the images recorded by the at least one optical camera respectively can be omitted for example.

The determining, if there is a connection between the motor vehicle and at least one transport device in this case takes place for example based on the data determined by the at least one sensor. Furthermore, the determining if there is a connection between the motor vehicle and at least one transport device can include a determining if there is an electric coupling between the motor vehicle and at least one transport device.

In a further configuration of the method it can be determined in addition if the at least one transport device connected to the motor vehicle is disconnecting from the motor vehicle. To this end, in this configuration, a determining of at least one further parameter. The at least one further parameter characterizes a possible imminent disconnecting of the at least one transport device from the motor vehicle, takes place based on the data determined by the at least one sensor. Based on the determined further parameter it is additionally determined if the at least one transport device is disconnecting from the motor vehicle. If it is determined in the process that the at least one transport device is disconnecting from the motor vehicle, an outputting of a warning message with the output device of the motor vehicle takes place again. The outputting of the warning message in this case can include an outputting of a visual warning message and/or an acoustic warning message and/or a haptic warning message.

The embodiment of the method can be carried out in particular in the event that it is determined that no object is fastened to the at least one transport device. This configuration can also be carried out in the event that it is determined that at least one object is fastened to the at least one transport device, i.e., it can be determined both if the at least one object is disconnecting from the at least one transport device as well as if the at least one transport device is disconnecting from the motor vehicle.

The application in addition relates to a method for operating a motor vehicle. The motor vehicle comprises at least one transport device. At least in a first operating position of the at least one transport device at least one object can be fastened to the at least one transport device and the motor vehicle comprises at least one sensor, where the at least one transport device at least in the first operating position is at least partially arranged within a recording range of the at least one sensor. The method comprises the following steps. A determining if at least one object is fastened to the at least one transport device takes place based on data determined by the at least one sensor. In the event that it is determined that at least one object is fastened to the at least one transport device, a determining of at least one parameter, where the at least one parameter characterizes a possible disconnecting of the at least one object from the at least one transport device, additionally takes place on data determined by the at least one sensor. In addition, a determining if the at least one object is disconnecting from the at least one transport device takes place based on the at least one determined parameter. In the event that it is determined that the at least one object is disconnecting from the at least one transport device, an outputting of a warning message with an output device of the motor vehicle takes place.

The method according to the embodiment in turn makes possible an improvement of the operational safety during a transport of objects with the motor vehicle, i.e., during a transport of at least one object with the at least one transport device. The at least one transport device in this embodiment is part of the motor vehicle. The at least one sensor in turn is preferably selected from an electromagnetic sensor, in particular a radar sensor or a lidar sensor, an acoustic sensor, in particular an ultrasound sensor, and an optical camera.

The determining of the at least one parameter in a further embodiment, in which the at least one sensor is embodied as an optical camera, includes a taking of at least one first image and a second image with the at least one optical camera and an evaluating of the first image and of the second image with a differential image method. Here, a differential image is generated, for example, from the first image and from the second image. Furthermore, with the at least one optical camera, images can be taken continuously or at predetermined time intervals and differential images generated from two consecutive images. In particular, the first image can be taken while the motor vehicle is stationary and the second image while the motor vehicle is travelling. From the two images, a template can subsequently be produced and for example the frequency of a movement of objects located within the template, determined. A disconnecting of the at least one object from the at least one transport device in this case is determined for example in the event that the frequency of such a movement exceeds a predetermined threshold value.

The determining of the at least one parameter can, in the event that the at least one sensor is designed as an optical camera, furthermore include a taking of at least one first image and of a second image with at least one optical camera and an evaluating of the first image and of the second image with a pattern recognition method. The evaluating of the first image and of the second image with a pattern recognition method in this case preferably takes place based on at least one predetermined pattern of at least one element, selected from a bicycle, a scooter, a transport box, a winter sport device, in particular a ski or a snowboard, a water sport device, in particular a wakeboard or a water-ski. In the mentioned embodiment, the first image and the second image are thus evaluated based on at least one predetermined pattern of at least one of the mentioned elements, i.e., relevant elements in the images that were recorded are searched by means of an image evaluation. If a relevant element, for example a bicycle is recognized in the images, the frequency of a movement of the recognized object can in turn be again determined from this and a warning message output in the event that the determined frequency exceeds a predetermined threshold value. The outputting of the warning message preferably includes an outputting of a visual warning message and/or an acoustic warning message and/or a haptic warning message.

The application furthermore relates to a motor vehicle, which comprises at least one sensor. The at least one sensor is arranged in such a manner that at least one transport device that can be rigidly connected to the motor vehicle in an outer area of the motor vehicle in a state in which it is connected to the motor vehicle is at least partially arranged within a recording range of the at least one sensor. In addition, the motor vehicle comprises a first determining device, which is designed for determining if at least one object is fastened to the at least one transport device, placed on data determined by the at least one sensor. Furthermore, the motor vehicle comprises a second determining device, which is designed for determining at least one parameter. The at least one parameter characterizes a possible disconnecting of the at least one object from the at least one transport device, based on data determined by the at least one sensor, in the event that it is determined that at least one object is fastened to the at least one transport device. In addition, the motor vehicle comprises a third determining device designed for determining if the at least one object is disconnecting from the at least one transport device, based on the at least one determined parameter. Furthermore, the motor vehicle comprises an output device which is designed for outputting a warning message in the event that it is determined that the at least one object is disconnecting from the at least one transport device. The motor vehicle according to the mentioned embodiment comprises the advantages according to the application already mentioned in connection with the first mentioned embodiment of the method, which are not mentioned again at this point to avoid repetitions.

Furthermore, the motor vehicle can comprise a coupling device, where with the coupling device the at least one transport device can be rigidly connected to the motor vehicle. The coupling device in this case is preferably designed as a trailer coupling. Because of this arrangement, a rigid connection between the transport device and the motor vehicle can be provided in a simple and reliable manner. The coupling device in this case is arranged on the motor vehicle in such a manner that the at least one transport device in the state in which it is connected to the motor vehicle is at least partly arranged within the recording range of the at least one sensor.

Furthermore, the application relates to a motor vehicle which comprises at least one transport device. At least in a first operating position of the at least one transport device at least one object can be fastened to the at least one transport device. In addition, the motor vehicle comprises at least one sensor, wherein the at least one sensor is arranged in such a manner that the at least one transport device at least in the first operating position is arranged at least partly within a recording range of the at least one sensor. Furthermore, the motor vehicle comprises a first determining device which is designed for determining if at least one object is fastened to the at least one transport device, based on data determined by the at least one sensor. In addition to this, the motor vehicle comprises a second determining device, which is designed for determining at least one parameter. The at least one parameter characterizes a possible disconnecting of the at least one object from the at least one transport device, based on data determined by the at least one sensor, in the event that it is determined that at least one object is fastened to the at least one transport device. Furthermore, the motor vehicle comprises a third determining device designed for determining if the at least one object is disconnecting from the at least one transport device, based on the at least one determined parameter. Furthermore, the motor vehicle comprises an output device that is designed for outputting a warning message in the event that it is determined that the at least one object is disconnecting from the at least one transport device.

The motor vehicle according to the mentioned embodiment comprises the advantages already mentioned in connection with the corresponding embodiment of the method, which are not mentioned again at this point to avoid repetitions. The at least one transport device in this case can be preferably brought from the first operating position into a second operating position, wherein the at least one transport device in the first operating position is arranged in an outer region of the motor vehicle and in the second operating position in an inner region of the motor vehicle. Because of this, the at least one transport device in the second operating position can be stowed within the motor vehicle, in the event that no transport of objects is required. In particular, the at least one transport device in the second operating position can be integrated in a vehicle floor of the motor vehicle.

The at least one sensor is preferably selected from an electromagnetic sensor, in particular a radar sensor or a lidar sensor, an acoustic sensor, in particular an ultrasound sensor, and an optical camera. The output device is preferably designed as a visual output device and/or acoustic output device and/or haptic output device. The motor vehicle is for example embodied as a passenger car, as a mobile home or as a bus.

The application in addition relates to a computer program product which, when it is executed on a computer unit of a motor vehicle. At least one transport device can be rigidly connected to the motor vehicle in an outer region of the motor vehicle. At least one object can be fastened to the at least one transport device and the motor vehicle comprises at least one sensor. The at least one transport device in a state in which it is connected to the motor vehicle is at least partially arranged within a recording range of the at least one sensor, instructs the computer unit to carry out the following steps. The computer unit is instructed for determining if at least one object is fastened to the at least one transport device, based on data determined by the at least one sensor. In the event that it is determined that at least one object is fastened to the at least one transport device the computer unit is furthermore instructed to determine at least one parameter. The at least one parameter characterizes a possible disconnecting of the at least one object from the at least one transport device, based on data determined by the at least one sensor. The computer unit is additionally instructed to determine if the at least one object is disconnecting from the at least one transport device based on the at least one determined parameter. In the event that it is determined that the at least one object is disconnecting from the at least one transport device, the computer unit is additionally instructed to output a warning message with an output device of the motor vehicle.

A computer program product is also provided for execution on a computer unit of a motor vehicle. The motor vehicle comprises at least one transport device, at least in a first operating position of the at least one transport device at least one object can be fastened to the at least one transport device and the motor vehicle comprises at least one sensor, the at least one transport device at least in the third operating position is at least partially arranged within a recording range of the at least one sensor, instructs the computer unit to carry out the following steps. The computer unit is instructed to determine if at least one object is fastened to the at least one transport device, based on data determined by the at least one sensor. In the event that it is determined that at least one object is fastened to the at least one transport device the computer unit is instructed to determine at least one parameter. The at least one parameter characterizes a possible disconnecting of the at least one object from the at least one transport device, based on data determined by the at least one sensor. Furthermore, the computer unit is instructed to determine if the at least one object is disconnecting from the at least one transport device based on the at least one determined parameter. In the event that it is determined that the at least one object is disconnecting from the at least one transport device, the computer unit is instructed for outputting a warning message by means of an output device of the motor vehicle.

Furthermore, the application relates to a computer-readable medium on which a computer program product according to any one of the mentioned embodiments is stored. The respective computer program product and the computer-readable medium according to the application have the advantages already mentioned in connection with the relevant methods according to the embodiments, which are not mentioned again at this point to avoid repetitions.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
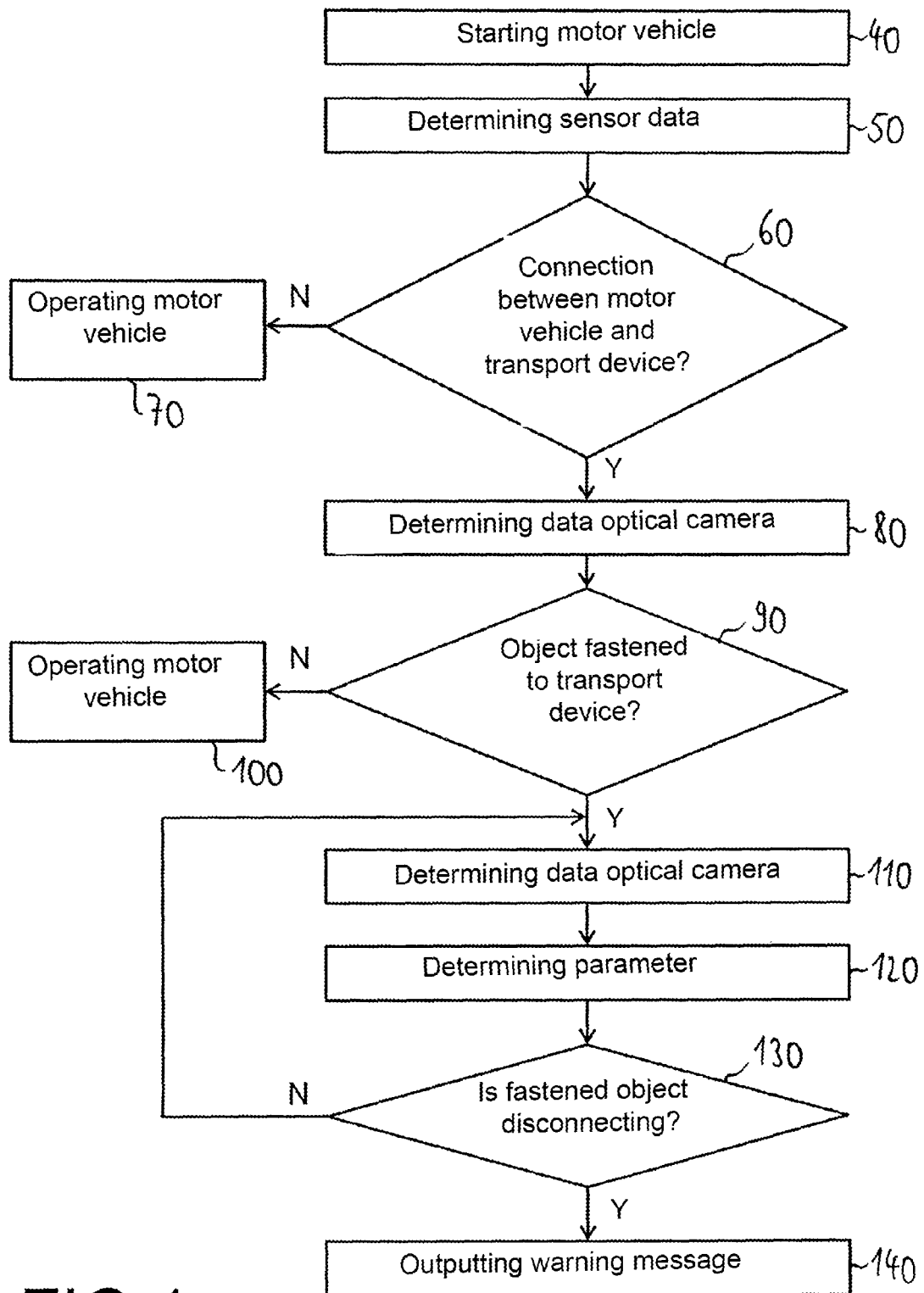
FIG. 1 shows a flow diagram of a method for operating a motor vehicle according to a first embodiment.

FIG. 1 shows a flow diagram of a method for operating a motor vehicle according to a first embodiment of the application. Here, at least one transport device in an outer region of the motor vehicle can be rigidly connected to the motor vehicle and at least one object can be fastened to the at least one transport device. Furthermore, the motor vehicle comprises at least one optical camera, wherein the at least one transport device and the at least one object in a state in which they are connected to the motor vehicle are at least partially arranged within a recording range of the at least one optical camera. The motor vehicle for example is a passenger car, a mobile home or a bus.

In a step 40, the motor vehicle is started. Furthermore, in a step 50 a determining of data with at least one sensor of the motor vehicle takes place. Based on the determined data a possible connection between the motor vehicle and the at least one transport device can be determined. For example, a determining of data with an electromagnetic sensor arranged in a rearward region of the motor vehicle, in particular a radar sensor and/or a lidar sensor, and/or an acoustic sensor, in particular an ultrasound sensor, takes place. Furthermore, data can be determined by the at least one optical camera. Furthermore, sensor data can be determined with which an electrical coupling between the motor vehicle and at least one transport device can be determined. For example, such data can be determined with a cable or plug connection, in particular in the event that the transport device can be connected to the motor vehicle with a trailer coupling of the motor vehicle.

In a step 60 it is determined based on the data determined in the step 50, if there is a connection between the motor vehicle and at least one transport device. If in the process it is determined that there is no connection, i.e., no transport device is connected to the motor vehicle, a corresponding operating mode of the motor vehicle without transport device is determined, as is shown with a step 70. In this operating mode for example no taking of images with the at least one optical camera takes place in driving mode.

If, by contrast, it is determined in the step 60 that there is a connection between the motor vehicle and at least one transport device, a determining of data by means of the at least one optical camera takes place in a step 80, i.e., a taking of at least one image with the optical camera.

In a further configuration, the determining of the optical data can take place in the step 80 in the event that this is requested with a user input for example through the actuation of an operating element of the motor vehicle. The method for monitoring the at least one transported object in this configuration is thus initiated with a user request.

In a step 90 it is determined based on data determined in the step 80 if at least one object is fastened to the at least one transport device. This takes place for example with a pattern recognition method in an image evaluation of images taken by the at least one optical camera. If it is determined in the process that no object is fastened to the at least one transport device a relevant operating mode of the motor vehicle without transported object is determined, as shown with a step 100.

If, by contrast, it is determined in the step 90 that at least one object is fastened to the at least one transport device, a renewed determining of data with at least one optical camera takes place in a step 110, i.e., a taking of images takes place again the at least one optical camera. Furthermore, in a step 120, a determining of at least one parameter takes place, wherein the at least one parameter characterizes a possible imminent disconnecting of the at least one object from the at least one transport device, based on data of the optical camera determined in the step 110.

For example, images taken by the at least one optical camera are evaluated with a differential image method and/or with a pattern recognition method. The evaluating of the images with a pattern recognition method in this case can take place based on at least one predetermined pattern of at least one element selected from the group of a bicycle, a scooter, a transport box, a winter sport device and a water sport device. From this, a frequency for example of a movement of objects determined in the taken images can be determined.

In a step 130 it is determined based on data determined in the step 120 if the at least one object starts disconnecting from the at least one transport device. For example it is determined in the step 130 if the frequency of a movement of the recognized objects exceeds a predetermined threshold value. If in the process it is determined that the at least one object is not starting to disconnect from the at least one transport device, for example in the event that the frequency of the movement does not exceed the predetermined threshold value, the steps 110, 120 and 130 are carried out repeatedly.

If, by contrast, it is determined in the step 130 that the at least one object starts disconnecting from the at least one transport device, for example in the event that a frequency of the movement exceeds the predetermined threshold value, an outputting of a warning message with an output device of the motor vehicle takes place in a step 140. The outputting of the warning message in this case can include an outputting of a visual warning message and/or an acoustic warning message and/or a haptic warning message.

In a configuration of the method it can be determined furthermore in the event that it is determined in the step 90 that no object is fastened to the at least one transport device, if the at least one transport device that is rigidly connected to the motor vehicle is disconnecting from the motor vehicle. To this end, a determining of data with the at least one optical camera can take place in a further step, i.e., a taking of images with the at least one optical camera. Furthermore, in this configuration, a determining of at least one further parameter takes place where the at least one further parameter characterizes a possible imminent disconnecting of the at least one transport device from the motor vehicle, based on the determined data of the optical camera. Based on the determined further parameter, it is determined furthermore if the at least one transport device is starting to disconnect from the motor vehicle. If it is determined in the process that the at least one transport device starts disconnecting from the motor vehicle an outputting of a warning message with the output device of the motor vehicle takes place again. Here, the outputting of the warning message can include an outputting of a visual warning message and/or an acoustic warning message and/or a haptic warning message.

Furthermore, in a further configuration of the method, the determining as to whether the at least one transport device is starting to disconnect from the motor vehicle, can also be carried out parallel to the determining as to whether the at least one object is starting to disconnect from the at least one transport device can be carried out in the event that it is determined in the step 90 that at least one object is fastened to the at least one transport device.

Figure 2:
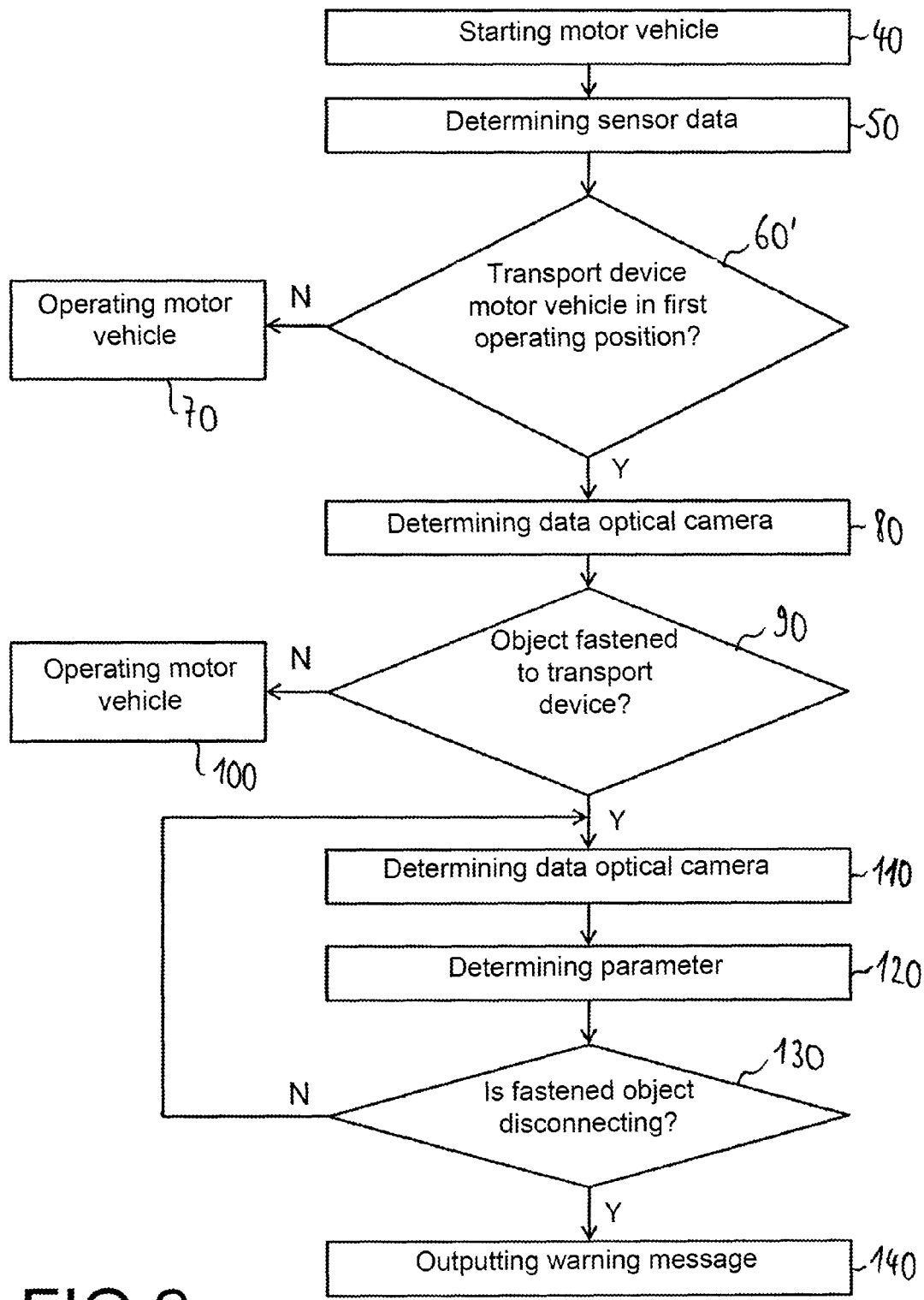
FIG. 2 shows a flow diagram of a method for operating a motor vehicle according to a second embodiment.

FIG. 2 shows a flow diagram of a method for operating a motor vehicle according to a second embodiment of the application. The motor vehicle is, for example, a passenger car and comprises at least one transport device, at least in a first operating position of the at least one transport device at least one object can be fastened to the at least one transport device. Furthermore, the motor vehicle comprises at least one optical camera, the at least one transport device and the at least one object are partially arranged within a recording range of the at least one optical camera, at least in the first operating position. The at least one transport device in this case can be brought from the first operating position into a second operating position in the shown embodiment. The at least one transport device in the second operating position is arranged in an interior region of the motor vehicle.

In a step 40, the motor vehicle is started, corresponding to the step 40 of the first embodiment shown in FIG. 1. In a step 50, a determining of data by at least one sensor of the motor vehicle, based on the determined data it can be determined if the at least one transport device is in the first operating position, takes place. For example, sensor data can be determined, which characterize an engaging of the at least one transport device in the first operating position.

In a step 60', it is determined, based on the data determined in the step 50, if the at least one transport device of the vehicle is in the first operating position. If in the process it is determined that the at least one transport device is not in the first operating position, for example, in the event that the at least one transport device is in the second operating position, a corresponding operating mode of the motor vehicle is determined, as is shown with a step 70. In this operating mode, for example no data are transmitted with the at least one optical camera. If, by contrast, it is determined by the step 60' that the at least one transport device is arranged in the first operating position, a determining of data with the at least one optical camera takes place in a step 80, corresponding to the step 80 of the first embodiment shown in FIG. 1.

It is determined, furthermore, in a step 90, if at least one object is fastened to the at least one transport device, corresponding to the step 90 of the first embodiment shown in FIG. 1. If it is determined, in the process, that no object is fastened to the at least on transport device, a corresponding operating mode of the motor vehicle is determined, as is shown in a step 100. If, by contrast, it is determined in the step 90 that at least one object is fastened to the at least one transport device, a determining of data with the at least one optical camera takes place in a step 110 and a determining of at least one parameter in a step 120. At least one parameter characterizes a possible disconnecting of the at least one object from the at least one transport device. Here, the steps 110 and 120 correspond to the step 110 and 120 of the first embodiment shown in FIG. 1.

It is determined, furthermore, in a step 130 based on the at least one determined parameter if the at least one object is disconnecting from the at least one transport device. This takes place corresponding to the step 130 of the first embodiment shown in FIG. 1. If it is determined, in the process, that the at least one object is not disconnecting from the at least one transport device, the steps 110, 120 and 130 are repeatedly carried out. In the event that it is determined, by contrast, that the at least one object is disconnecting from the at least one transport device, an outputting of a warning message with an output device of the motor vehicle takes place in a step 140, corresponding to the step 140 of the first embodiment shown in FIG. 1.

The mentioned embodiments thus make possible a monitoring of in particular bicycles or other objects, which are typically transported behind the vehicle, for example on a trailer coupling or a rear carrier. Corresponding rear carriers and carriers for the trailer coupling are increasingly becoming important in the transport for example of bicycles with the car. This is based on the consideration that for example bicycles, which are transported behind the vehicle, cannot be seen by the driver of the motor vehicle while driving. In particular, through incorrect operation or material fatigue it can happen that the bicycles break loose while driving. The reversing camera which is available optionally, i.e. as an accessory, can be utilized for monitoring the bicycles while driving. This makes possible in particular in combination with an image recognition software a substantial improvement of the operational safety. In addition, accidents through lost objects are avoided. In the event that a fastening of a wheel is disconnecting while driving, this software or the corresponding method could detect the movement of the bicycle connected with the disconnecting of the fastening and trigger an alarm.

The at least one object to be transported, which is monitored, can include single-track vehicles, such as for example scooters, bicycles, electric scooters and electric bikes, transport boxes, transport trellises or grates, skis, water-skis, wakeboards and snowboards. Activating the monitoring can take place actively through selection in a menu or with an operating element, for example an operating knob, or automatically when for example plugging in the electric coupling for the lighting of the carrier or upon an engaging of a rear bicycle carrier.

Monitoring can also take place for example through permanent video monitoring through the camera, in particular through a camera designed as a reversing camera or through so-called snapshot images. It is possible, furthermore that a camera records an image in a stationary state and a second image is recorded while driving. From these two images a template can be produced and as soon as the parts which are located within the template move with a certain frequency, an alarm can be triggered. In a further variant it is also possible that for example the driver of the vehicle activates the reversing camera while driving and thereby can determine if the bicycles are still properly fastened.

Figure 3:
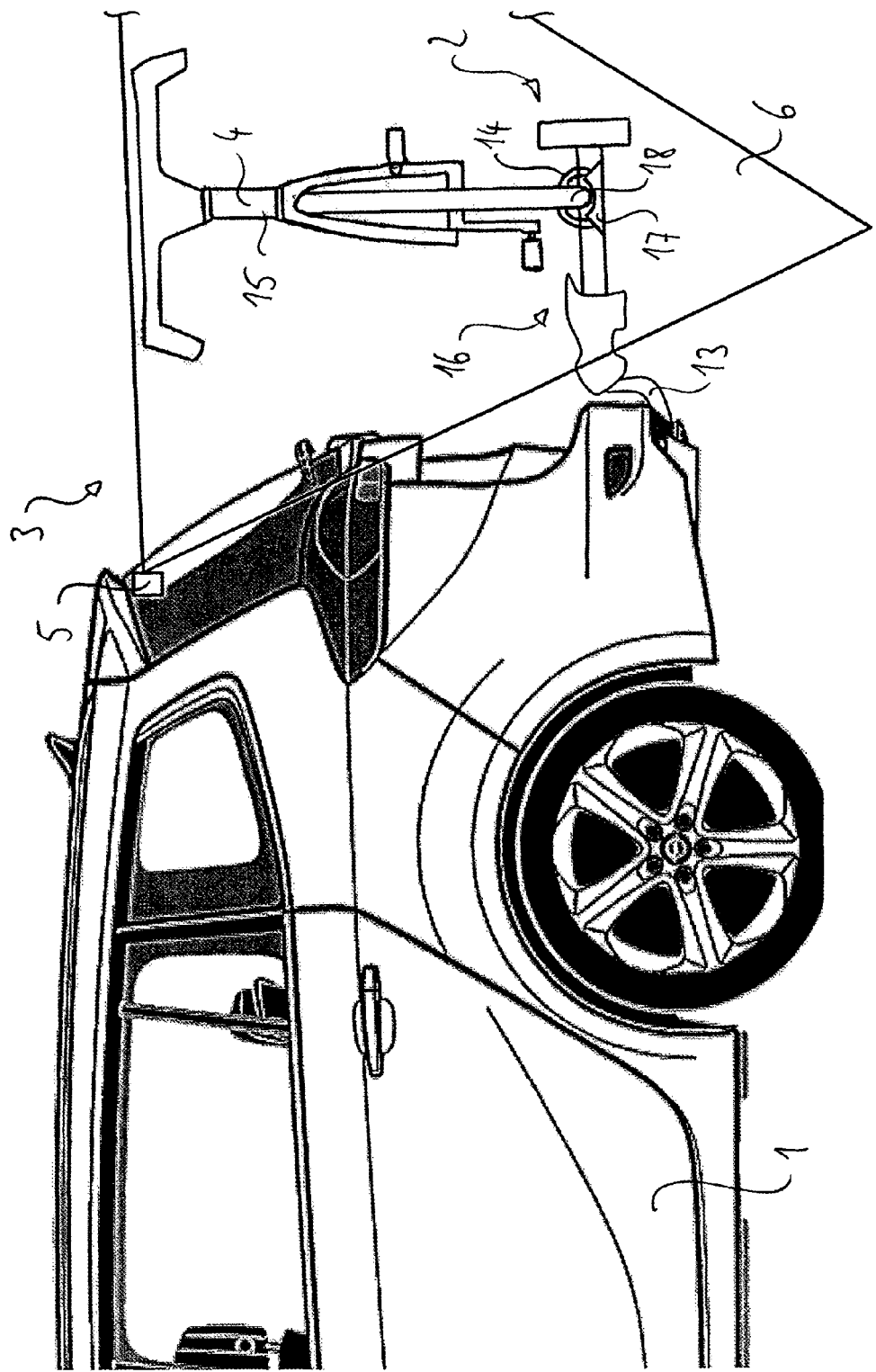
FIG. 3 shows a part region of a motor vehicle according to a first embodiment.

FIG. 3 shows a part region of a motor vehicle 1 according to a first embodiment. In the shown embodiment, the motor vehicle 1 is a passenger car and comprises a towing device 13 in the form of a trailer coupling. A transport device 2 is rigidly connected to the motor vehicle 1 with the towing device 13 in an outer region 3 of the motor vehicle 1. An object 4 in the form of a bicycle 15 is fastened to the transport device 2, which in the shown embodiment forms a bicycle carrier 16 with a plurality of fastening elements, of which in FIG. 3 merely one clamping strap 14 is shown. The clamping strap 14 in this case secures a tire 18 of the bicycle 15 in a receiving device 17, which forms a wheel mounting.

In the shown embodiment, the motor vehicle 1 furthermore comprises a sensor 5 in the form of an optical camera. The optical camera is arranged in a rearward region of the motor vehicle 1 such that the transport device 2 that is rigidly connected to the motor vehicle 1 in the outer region 3 and the object 4 fastened to the transport device 2 in the state in which it is connected to the motor vehicle 1 are at least partially arranged within a schematically represented recording range 6 of the optical camera.

Figure 5:
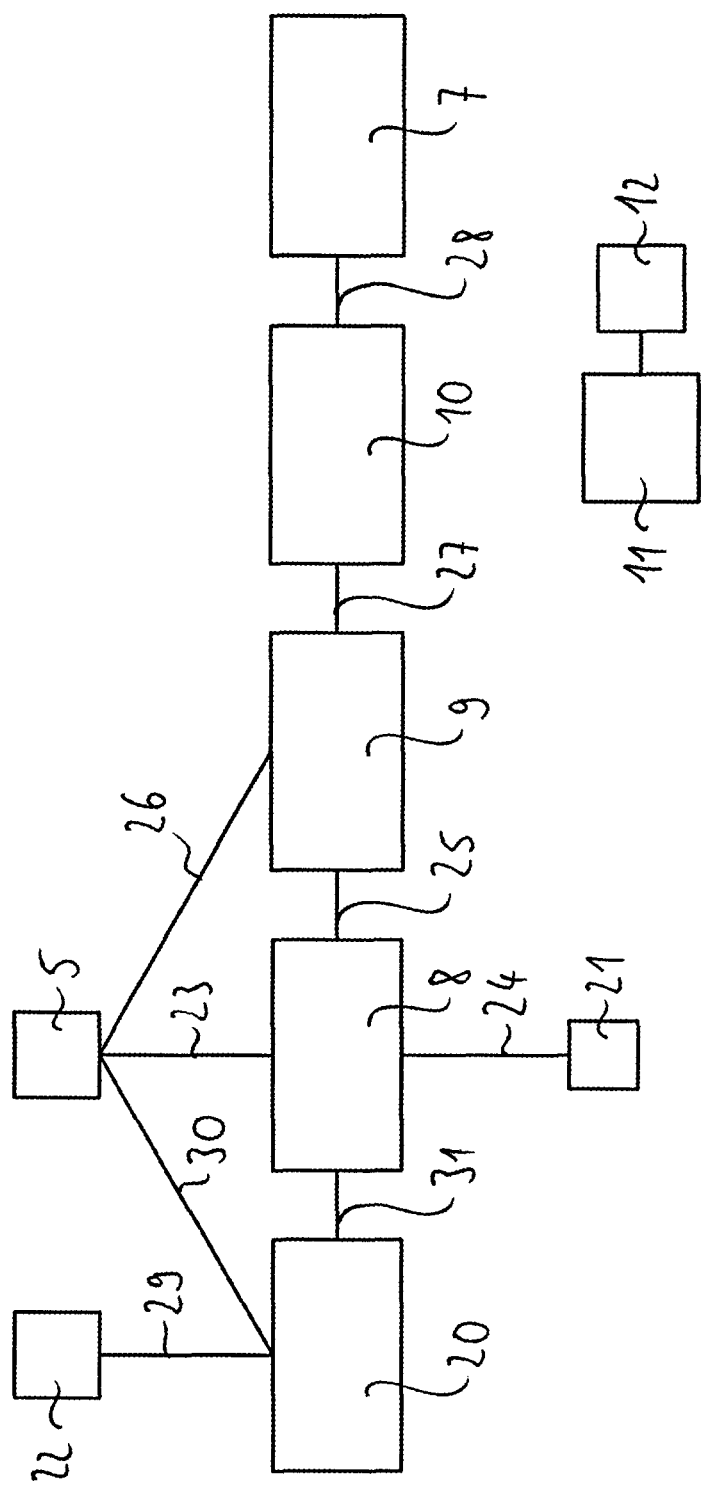
FIG. 5 shows components of the motor vehicles shown in the FIG. 3 and FIG. 4.

As is explained in more detail in connection with FIG. 5, a warning message can be output with an output device of the motor vehicle 1 in the event that based on data determined by the optical camera it is determined that the object 4 in the form of the bicycle 15 is disconnecting from the transport device 2.

Figure 4:
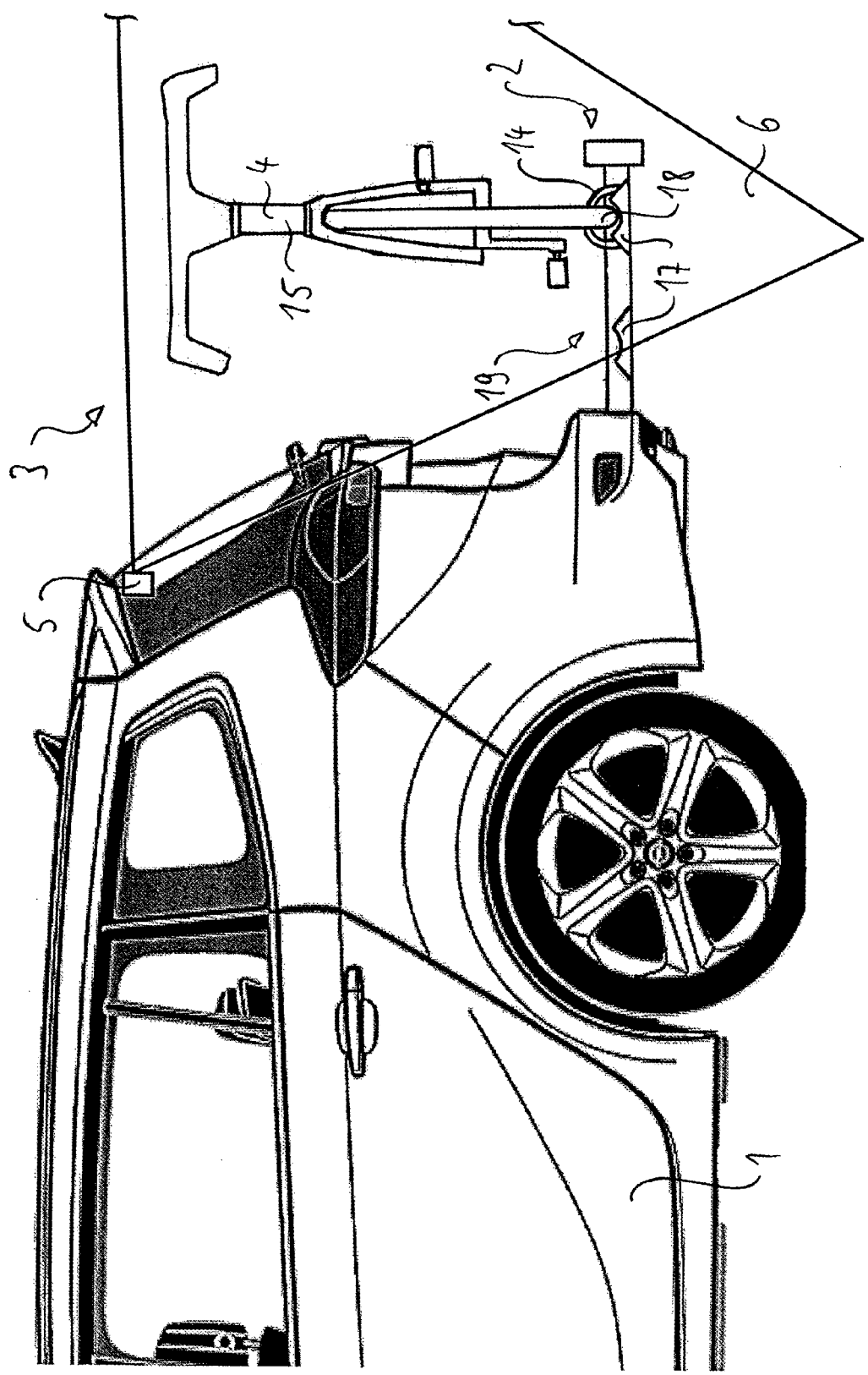
FIG. 4 shows a part region of a motor vehicle according to a second embodiment.

FIG. 4 shows a part region of a motor vehicle 1 according to a second embodiment. Components with the same functions as in FIG. 3 are marked with the same reference numbers and are not explained again in the following. The motor vehicle 1 shown in FIG. 4 differs from the motor vehicle shown in FIG. 3 in that the transport device 2 is part of the motor vehicle 1. Here, the transport device 2 is designed as a rear carrier 19. In a first operating position of the transport device 2 shown in FIG. 4 at least two bicycles can be fastened to the transport device 2 in the shown embodiment. Furthermore, the transport device 2 can be brought from the first operating position into a second operating position, wherein the transport device 2 in the second operating position is integrated in the vehicle floor of the motor vehicle 1. The sensor 5 in the form of the optical camera is arranged such that the transport device 2 as well as the at least one bicycle 15 fastened to the transport device is at least partially arranged within the recording range 6 of the optical camera in the first operating position.

As is explained in more detail in connection with the following figure, a warning message can be output by means of an output device of the motor vehicle 1 in the event that based on data determined by the optical camera it is determined that the bicycle 15 is disconnecting from the transport device 2. To this end, FIG. 5 shows components of the motor vehicles 1 shown in the FIG. 3 and FIG. 4. For the sake of clarity, the respective motor vehicle in FIG. 5 is not shown in more detail. Components with the same functions as in the preceding figures are marked with the same reference numbers and are not explained again in the following.

The motor vehicle comprises a first determining device 8, which is designed for determining if at least one object is fastened to the transport device, based on data determined by the sensor 5 in the form of the optical camera. To this end, the first determining device 8 is connected to the sensor 5 via a signal line 23. In addition, the motor vehicle comprises a second determining device 9, which is designed for determining at least one parameter. The at least one parameter characterizes a possible disconnecting of the at least one object from the transport device, based on data determined by the sensor 5 in the form of the optical camera, in the event that it is determined that at least one object is fastened to the transport device. To this end, the second determining device 9 is connected to the first determining device 8 via a signal line 25 and to the sensor 5 via a signal line 26.

Furthermore, the motor vehicle comprises a third determining device 10, which is designed for determining if the at least one object is disconnecting from the transport device, based on the at least one determined parameter. To this end, the third determining device 10 is connected to the second determining device 9 via a signal line 27.

Furthermore, the motor vehicle comprises an output device 7, which is designed for outputting a warning message in the event that it is determined that the at least one object is disconnecting from the transport device. To this end, the output device 7 is connected to the third determining device 10 via a signal line 28 and for example designed as a visual and/or acoustic and/or haptic output device.

In addition to this, the motor vehicle comprises a fourth determining device 20 in the shown embodiment. The fourth determining device 20 is designed for determining if there is a connection between the motor vehicle and at least one transport device in the event that the transport device is not part of the motor vehicle. In the event that the motor vehicle comprises a transport device, the fourth determining device 20 is designed for determining if the transport device is in the first operating position, in which at least one object can be fastened to the transport device. To this end, the fourth determining device 20 is connected via a signal line 29 to a sensor 22, which for example is designed for determining if there is an electric coupling between the motor vehicle and at least one transport device in the event that the transport device is not part of the motor vehicle. In the event that the transport device is part of the motor vehicle, the sensor 22 is designed for example for determining if the transport device is engaged in the first operating position. Furthermore, the fourth determining device 20 is connected to the sensor 5 via a signal line 30. Thus, corresponding data can be likewise determined based on data determined with the sensor 5 in the form of the optical camera.

In the shown embodiment, the first determining device 8 is configured for determining if at least one object is fastened to the transport device, in the event that it is determined with the fourth determining device 20 that there is a connection between the motor vehicle and at least one transport device and that the transport device is arranged in the first operating position. To this end, the first determining device 8 is connected to the fourth determining device 20 via a signal line 31.

Furthermore, the first determining device 8 is designed in the shown embodiment for determining if at least one object is fastened to the transport device, in the event that a corresponding user request takes place with an operating element 21. The first determining device 8 to this end is connected to the operating element 21 via a signal line 24.

In the shown embodiment, the motor vehicle furthermore comprises a computer unit 11 and a computer-readable medium 12, where on the computer-readable medium 12 a computer program product is stored which, when it is executed on the computer unit 11, instructs the computer unit 11 to carry out the step mentioned in connection with the embodiments of the method according to the application, in particular the steps of the embodiment shown in the FIG. 1 and FIG. 2, with the elements mentioned there. To this end, the computer unit 11 is directly or indirectly connected to the corresponding elements in a manner which is not shown in more detail.

Although at least one exemplary embodiment has been shown in the preceding description, various changes and modifications can be carried out. The mentioned embodiments are merely examples and not intended to restrict the range of validity, the applicability or the configuration in any way. The preceding description rather provides the person skilled in the art with a plan for implementing at least one exemplary embodiment, where numerous changes in the function and the arrangement of elements described in an exemplary embodiment can be made without leaving the scope of protection of the attached claims and their legal equivalent.

What is claimed is:

1. A method for operating a motor vehicle with a transport device that is configured for a rigid connection to the motor vehicle in an outer region of the motor vehicle and an object fastened to the transport device, the motor vehicle comprising a sensor and the transport device that, when connected to the motor vehicle, at least partially arranged within a recording range of the sensor, the method comprising:
    a first determining step of determining with the sensor if the object is fastened to the transport device;
    monitoring a parameter when the first determining step determines that the object is fastened to the transport device, wherein the parameter characterizes a possible disconnecting of the object from the transport device based on data determined by the sensor;
    a second determining step of determining if the object is disconnecting from the transport device based on the parameter;
    outputting of a warning message with an output device of the motor vehicle only when the first determining step determines that the object is fastened to the transport device and when the second determining step determines that the object is disconnecting from the transport device.

2. The method according to claim 1, further comprising a third determining step of determining whether there is a connection between the motor vehicle and the transport device, and wherein the first determining step determines if the object is fastened to the transport device only when the third determining step determines that there is the connection between the motor vehicle and the transport device.

3. The method according to claim 2, wherein the third determining step comprises determining whether there is an electrical coupling between the motor vehicle and the transport device.

4. The method according to claim 1, wherein the sensor is an electromagnetic sensor.

5. A method for operating a motor vehicle with a transport device having a first operating position that is configured to fasten an object to the transport device, the motor vehicle comprising a sensor and the transport device in the first operating position is at least partially arranged within a recording range of the sensor, the method comprising:
a first determining step of determining with data from the sensor if the object is fastened to the transport device
monitoring a parameter when the first determining step determines that the object is fastened to the transport device, wherein the parameter characterizes a possible disconnecting of the object from the transport device based on the data determined by the sensor;
a second determining step of determining if the object is disconnecting from the transport device based on the parameter;
outputting a warning message with an output device of the motor vehicle only when the first determining step determines that the object is fastened to the transport device and when the second determining step determines that the object is disconnecting from the transport device.

6. The method according to claim 5,
wherein the sensor is an optical camera, and
wherein the monitoring of the parameter comprises a taking of a first image and a second image with the optical camera and evaluating the first image and the second image with a differential image method.

7. The method according to claim 5, wherein the sensor is an optical camera and the monitoring of the parameter comprises a taking of a first image and a second image with the optical camera and an evaluating of the first image and of the second image with a pattern recognition method.

8. The method according to claim 7, wherein the evaluating of the first image and the second image with the pattern recognition method takes place based on a predetermined pattern of a bicycle.

9. A motor vehicle, comprising
a sensor is arranged such that a transport device is rigidly connected to the motor vehicle in an outer region within a recording range of the sensor;
a first determining device is configured to determine if an object is fastened to the transport device based on data determined by the sensor;
a second determining device that is configured to determine a parameter that characterizes a possible disconnecting of the object from the transport device based on the data determined by the sensor upon determining with the first determining device that the object is fastened to the transport device;
a third determining device that is configured to determine if the object is disconnecting from the transport device based on the parameter; and
an output device that is configured to output a warning message only when the first determining device determines that the object is fastened to the transport device and when the third determining device determines that the object is disconnecting from the transport device.

10. The motor vehicle according to claim 9, wherein the sensor is an acoustic sensor.

11. The motor vehicle according to claim 9, wherein the sensor is an electromagnetic sensor.

12. The motor vehicle according to claim 9, wherein the sensor is an optical camera.

13. A motor vehicle, comprising
a transport device having a first operating position of for fastening to an object;
a sensor arranged such that the transport device in the first operating position is at least partially arranged within a recording range of the sensor,
a first determining device that is configured to determine if the object is fastened to the transport device based on data determined by the sensor;
a second determining device that is configured to determine a parameter, the parameter characterizing a possible disconnecting of the object from the transport device based on the data determined by the sensor when the first determining device determines that the object is fastened to the transport device,
a third determining device that is configured to determine if the object is disconnecting from the transport device based on the parameter;
an output device that is configured to output a warning message only when the first determining device determines that the object is fastened to the transport device and when the third determining device determines that the object is disconnecting from the transport device.

14. The motor vehicle according to claim 13,
wherein the transport device is configured to transition from the first operating position into a second operating position,
wherein the transport device in the first operating position is arranged in an outer region of the motor vehicle and the transport device in the second operating position is arranged in an inner region of the motor vehicle.

* * * * *